March 6, 1934.    A. MESSER    1,949,616
FREEZING OUT OF WATER VAPORS CONTAINED IN COMPRESSED
GASES OR GAS MIXTURES TO BE LIQUEFIED
Filed Dec. 7, 1932
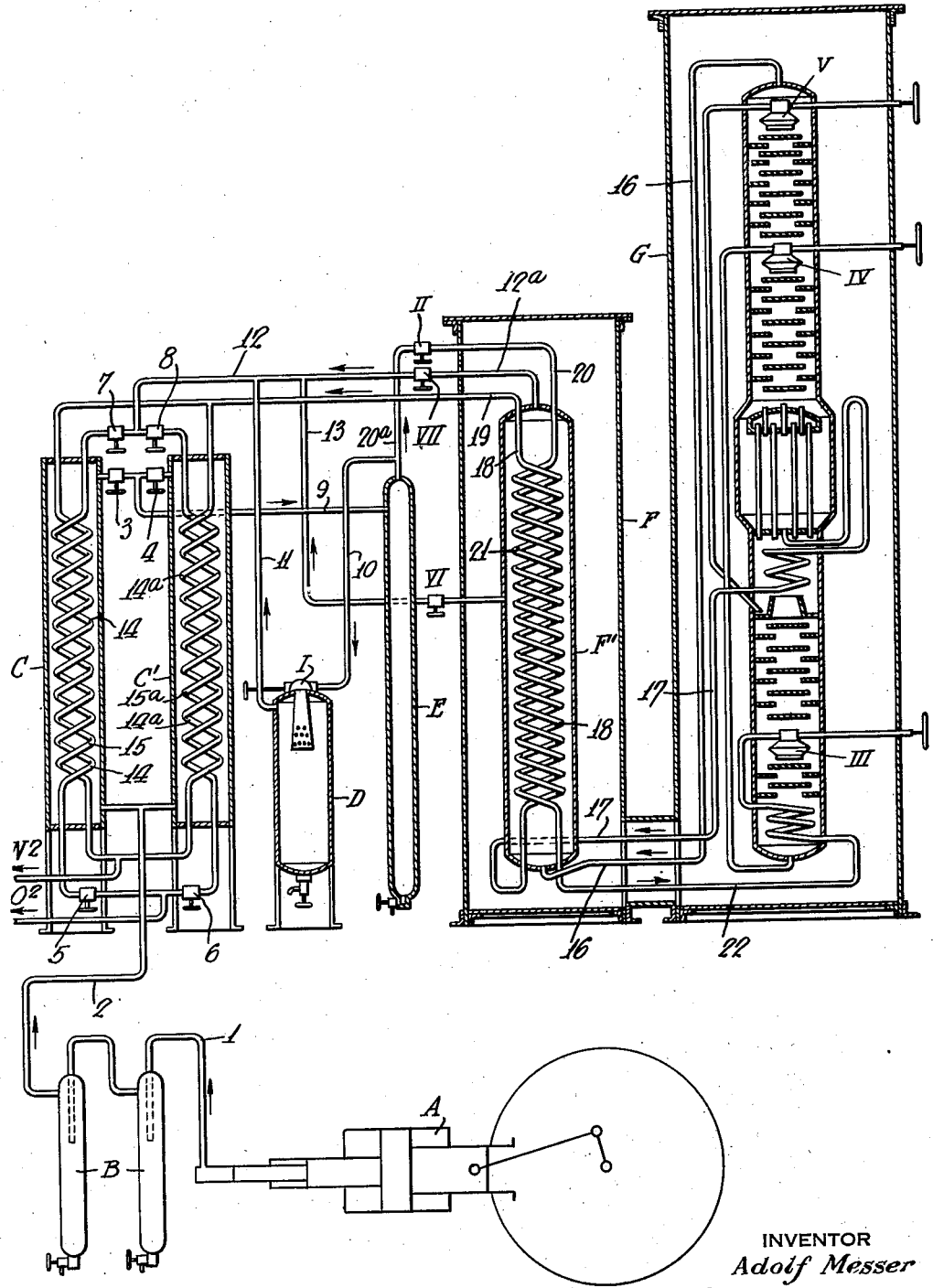
INVENTOR
Adolf Messer
BY
ATTORNEYS Patented Mar. 6, 1934

1,949,616

UNITED STATES PATENT OFFICE

1,949,616

FREEZING OUT OF WATER VAPORS CONTAINED IN COMPRESSED GASES OR GAS MIXTURES TO BE LIQUEFIED

Adolf Messer, Frankfort-on-the-Main, Germany

Application December 7, 1932, Serial No. 646,085
In Germany September 16, 1930

8 Claims. (Cl. 62—122)

Certain features of this application are included in German applications filed September 16, 1930, and April 8, 1932.

In medium-sized and small plants for liquefying and/or rectifying gases or gas-mixtures, for example for separating oxygen and nitrogen from air, by such means as are shown in my United States Patent No. 1,785,491, drying batteries are commonly used for removing the water vapors from the gas preliminary to the liquefaction process. These batteries usually consist of containers filled with a drying or hygroscopic substance, such for example, as caustic potash, calcium chloride, silica gel or the like. In larger plants these drying batteries have already been successfully replaced by reversible freezing-out or condenser apparatus in the form of heat exchangers in which the moisture in the incoming gas is caused to separate as water, above 0° C., and as ice below 0° C., according to the vapor pressure at these temperatures. The cooling effect in such condenser apparatus is usually produced by the vaporization of liquid ammonia in a separate refrigerating cycle.

When such ammonia refrigerating apparatus is used, there is produced such a low temperature in the cooling apparatus prior to the introduction of the gas or gas-mixture to be liquefied, that the moisture is thereby precipitated in the freezing-out apparatus, and the low temperature heat exchanger as well as the liquefaction and/or rectification apparatus receive the gas or gas-mixture to be liquefied in a dry condition from the start. The ammonia refrigerating arrangement in such plants also serves for maintaining the low temperature necessary in the reversible cooling and freezing-out apparatus for freezing-out the moisture during normal operation of the plant.

One object of the present invention is to provide a process and apparatus by means of which the water vapors in the gases to be liquefied and rectified, are entirely and efficiently removed without the use of drying substances, and without the use of a separate refrigerating system involving the vaporization of a liquid refrigerant such as ammonia.

One difficulty in securing this object resides in the fact that in the freezing-out apparatus, a temperature must be produced, even during the starting up period, which is sufficiently low to condense all of the moisture before the gas or gas-mixture to be liquefied reaches the low temperature cooling device and the liquefying apparatus.

In carrying out my invention, the compressed gas or gas-mixture, after passing through the freezing-out apparatus, is expanded through a valve and delivered at a low temperature into said apparatus in countercurrent heat exchange relationship with compressed gas or gas-mixture flowing in. Two of these apparatus are advantageously provided for alternate operation. The low temperature cooling device and the liquefying apparatus are closed off during this operation, so that the moisture containing compressed gas or gas-mixture cannot enter these latter apparatus. By pre-cooling and expanding the gas or gas-mixture to be liquefied, after passing the freezing-out apparatus, a low temperature condition is finally reached in said apparatus, such that the water vapor content corresponding to this temperature, and which remains in the gas or gas-mixture to be liquefied, is sufficiently low and the gas or gas-mixture attains the desired degree of dryness.

After this condition has been attained, the compressed gas or gas-mixture to be liquefied is gradually admitted to the low temperature cooling and liquefying apparatus. At the same time, the expansion valve which produces the cold of the freezing-out apparatus is gradually closed. This gradual adjustment must be carried out in such a manner that the temperature in the cold region of the freezing-out apparatus does not rise. At the end of the starting up period, the entire amount of gas or gas-mixture to be liquefied is made to flow through the low temperature cooling device and then, the expansion valve being open during the starting up is completely closed.

After normal operation has been reached, it is important to maintain the necessary temperature of the freezing-out apparatus constant and low enough to effect sufficient separation of the moisture of the compressed gas flowing therein. For that purpose, there is provided a pipe connection having a valve whereby it is possible to deliver a part of the rectified product or gas flowing back from a cold region of the system, as for example, from the low temperature cooling device directly into the freezing-out apparatus.

In the accompanying drawing, there is shown for the purpose of illustration, a diagrammatic vertical section through an apparatus adapted for the purpose of liquefying and rectifying air to separate oxygen and nitrogen, and embodying the present invention.

On starting up, air, freed from carbon dioxide, is compressed in a compressor A to a pressure, for example, of 200 atm. (gauge) and delivered through a pipe line 1 into one or more separators B where it is freed from oil which has been carried along. The air is then passed through a pipe line 2 to the bottom of one of a pair of similar freezing-out apparatus or heat exchangers C and C', containing coils 14 and 15, and 14a and 15a respectively. These exchangers are alternately operated and defrosted, only one being operated to freeze out moisture at one time, while the other is being defrosted. The exchangers C and C' are provided at their upper ends with outlets for the compressed air controlled by valves 3 and 4. The coils 14 and 14a deliver the separated oxygen through the exchangers and have valves 5 and 6 at the outlet thereof, and coils 15 and 15a deliver separated nitrogen through the exchanger and are similar provided at their outlets with valves 7 and 8.

From these freezing-out apparatus C and C', the high pressure air passes through a pipe 9 into a snow trap E, where the velocity of the air is decreased and the snow which is condensed from the air and carried therewith collects. At the beginning of operations, the air flows from the outlet of the trap E through a line 10 to an expansion valve I, where it is expanded to approximately atmospheric pressure and delivered into an expansion chamber D in which the snow precipitated during the expansion settles out. The expanded air flows through a line 11 back into one of the freezing-out apparatus. During initial operations, it is advantageous to return the expanded air to the exchanger through a line 12 and nitrogen coils 15 or 15a.

The system also includes a low temperature cooling apparatus or heat exchanger F and a liquefying and rectifying apparatus G. These apparatus are provided with pipe connections to receive dried compressed air and return the rectified products. Valves II, VI and VII are provided to control the flow of gas to and from said apparatus, these valves being closed during the initial air drying operation.

By precooling and expanding the air, a temperature, for example, of −40° C., is obtained, in the cold region of the freezing-out apparatus C or C', this temperature being sufficient to dry the air. The greater part of the water vapor precipitated from the air settles out in the expansion chamber D, where it is deposited in the form of snow. The amount of water vapor separated out in the freezing-out apparatus, in the form of liquid above 0° C., is blown out from time to time. The snow formed below this temperature is removed by defrosting after the second of the freezing-out apparatus has been put into operation. The alternate operation of the two apparatus C and C' is effected by maintaining valves 3, 5 and 7 closed while maintaining valves 4, 6 and 8 open, and vice versa.

The heat exchanger F, during normal operations, is adapted to cool the dried compressed air to a low temperature by passing said air therein in heat exchange relationship with the separated gases delivered from the rectifying apparatus G. The rectifying apparatus G may be of any suitable construction, such as that shown in my United States Patent No. 1,785,491, and rectifies the air to separate oxygen and nitrogen. The separated nitrogen passes from the apparatus G through pipe line 16 and into the bottom of the vessel F' forming part of the exchanger F, and in countercurrent relationship with the incoming air. The nitrogen then passes out at the top through a line 12a through valve VII and pipe line 12, into one of the coils 15 or 15a of one of the heat exchangers C or C' in countercurrent relationship with the incoming air in said exchanger. The oxygen passes out of the rectifying apparatus G through a pipe line 17, then through a coil 18 in the exchanger F and in countercurrent relationship with the incoming air in said exchanger, and out through a line 19 into the coils 14 or 14a in countercurrent relationship with the incoming air in the exchangers C and C'. The high pressure air flows from the snow trap E through a line 20a, valve II and line 20, and through a coil 21, in the exchanger F, and then through a pipe line 22 to an expansion valve III in the liquefying apparatus G.

As soon as a sufficiently low temperature has been attained in the cold region of the freezing-out apparatus, valves II and VII may be opened completely and expansion valves III, IV and V in the rectifying apparatus G opened gradually. Valve I is slowly closed at the same time and approximately to the same degree. A part of the dried high pressure air then passes into the trap E in which the snow carried along from the freezing-out apparatus separates out, and then through pipe line 20a and valve II, into pipe line 20 and then through the coil 21 in the exchanger F, to the liquefying apparatus G, where it is successively expanded through valves III, IV and V, and then returned to the heat exchanger. Thus, by the expansion and precooling of the high pressure air, the exchanger F and rectifying apparatus G are gradually cooled. While these apparatus are being progressively cooled, the valve I is being gradually closed and valves III, IV and V are being gradually opened at the same time. The final adjustment of these valves for normal operation takes place when the entire amount of high pressure air passes into the cooling device F and the rectifying apparatus, and constant temperature condition for regular operation has been attained.

During regular operation, the temperature necessary for freezing-out the moisture of the air is kept constant to the desired extent in the freezing-out apparatus C and C', by taking off a part of the return flowing cold nitrogen from the exchanger F through a pipe line 13 and regulating valve VI, and delivering it to the nitrogen passing through the pipe 12 into the apparatus C and C'. The regulation of the amount of nitrogen flowing through pipe 13 is also effected by the adjustment of valves VI and VII.

Having thus described my invention, what I claim as new and desire to secure by Letters Patent is:—

1. An apparatus for separating one or more gas components from a gas mixture, which includes means for compressing the mixture, a heat exchange unit having an inlet and an outlet for said compressed mixture, an expansion valve at the outlet of said unit, means for removing moisture from the expanded air, means for returning the expanded mixture to said heat exchange unit out of contact with freshly incoming compressed mixture but in heat exchange relationship therewith, a rectification column, pipe connections for delivering the compressed mixture from said heat exchange unit to said column, said connections having valves thereon whereby said column may be shut off from receiving compressed mixture from said unit until a predetermined temperature condition has been attained in said unit sufficient to condense substantially all the water vapors from the compressed mixture therein.

2. An apparatus for separating one or more gas components from a gas mixture, which includes means for compressing the mixture, a heat exchange unit having an inlet and an outlet for said compressed mixture, an expansion valve at the outlet of said unit, means for removing moisture from the expanded air, means for returning the expanded gas mixture to said unit out of contact with the incoming mixture but in countercurrent heat exchange relationship therewith, a liquefaction and rectification column for separating one or more of the gas components from said compressed gas mixture, pipe connections for delivering the compressed mixture from said unit to said column, and valves on said connections whereby said column may be shut off from receiving compressed mixture from said unit until a predetermined temperature condition has been attained in said unit sufficient to produce a dried compressed mixture, and deliver separated gas to said heat exchange unit in heat exchange relationship with the freshly incoming gas.

3. An apparatus for separating air into oxygen and nitrogen, which includes means for compressing the air, a heat exchange unit having an inlet and an outlet for said air, an expansion valve at the outlet of said unit, means for removing moisture from the expanded air, means for returning the expanded air to said unit out of contact with freshly incoming air therein but in heat exchange relationship therewith, a low temperature cooling apparatus, pipe connections for delivering the compressed air from said heat exchange unit to said cooling apparatus, valves on said pipe connections whereby said cooling apparatus may be shut off from receiving compressed air from said unit, a liquefying and rectifying apparatus for separating the air into oxygen and nitrogen, connections for delivering the compressed air from said cooling apparatus to said liquefying and rectifying apparatus, means for delivering separated oxygen and nitrogen from said rectifying apparatus through said cooling apparatus in heat exchange relationship with the incoming compressed air, and means for delivering the oxygen and nitrogen from said cooling apparatus to said heat exchange unit in countercurrent heat exchange relationship with the compressed air flowing therein.

4. An apparatus for drying gas mixtures preliminary to liquefying and separating one or more components therefrom which includes means for compressing the mixture, a heat exchange unit having an inlet and an outlet for said compressed mixture, an expansion valve at the outlet of said unit, means for removing moisture from the expanded air, means for returning the expanded mixture to said heat exchange unit out of contact with freshly incoming compressed mixture but in heat exchange relationship therewith, a low temperature cooling apparatus, pipe connections for delivering the compressed mixture from said heat exchange unit to said cooling apparatus, said connections having valves thereon, whereby said low temperature cooling apparatus may be shut off from receiving compressed mixture from said unit until a predetermined temperature condition has been attained in said unit sufficient to condense substantially all the water vapors from the compressed mixture therein, a liquefying and rectification column for separating the compressed mixture in their components, means for delivering the separated components from said rectifying column through said cooling apparatus in heat exchange relationship with the incoming compressed mixture, and pipe connections for delivering the said separated components from said cooling apparatus to said heat exchange unit in countercurrent heat exchange relationship with the compressed mixture flowing therein.

5. An apparatus for drying gas mixtures preliminary to liquefying and separating one or more components therefrom which includes means for compressing the mixture, a heat exchange unit having an inlet and an outlet for said compressed mixture, an expansion valve at the outlet of said unit, pipe connections between the expansion valve and the pipe for one of the separated components for returning the expanded mixture to said heat exchange unit, means for returning the expanded mixture to said heat exchange unit out of contact with freshly incoming compressed mixture but in heat exchange relationship therewith, a low temperature cooling apparatus, pipe connections for delivering the compressed mixture from said heat exchange unit to said cooling apparatus, said connections having valves thereon, whereby said low temperature cooling apparatus may be shut off from receiving compressed mixture from said unit until a predetermined temperature condition has been attained in said unit sufficient to condense substantially all the water vapors from the compressed mixture therein, a liquefying and rectification column for separating the compressed mixture in their components, means for delivering the separated components from said rectifying column through said cooling apparatus in heat exchange relationship with the incoming compressed mixture, and pipe connections for delivering the said separated components from said cooling apparatus to said heat exchange unit in countercurrent heat exchange relationship with the compressed mixture flowing therein, and valves in said pipe connections for preventing the expanded mixture from flowing into the cooling apparatus until a predetermined temperature condition has been attained in said unit sufficient to condense substantially all the water vapors from the compressed mixture therein.

6. An apparatus for drying gas mixture preliminary to liquefying and separating one or more components therefrom which includes means for compressing the mixture, a heat exchange unit having an inlet and an outlet for said compressed mixture, an expansion valve at the outlet of said unit, pipe connections between the expansion valve and the pipe for one of the separated components for returning the expanded mixture to said heat exchange unit, means for returning the expanded mixture to said heat exchange unit out of contact with freshly incoming compressed mixture but in heat exchange relationship therewith, a vessel for separating ice resulting from the water vapors, pipe connections between the vessel and the heat exchange unit, a low temperature cooling apparatus, pipe connections for delivering the compressed mixture from said vessel to said cooling apparatus, pipe connections for delivering the compressed mixture from said heat exchange unit to said cooling apparatus, said connections having valves thereon, whereby said low temperature cooling apparatus may be shut off from receiving compressed mixture from said unit until a predetermined temperature condition has been attained in said unit sufficient to condense substantially all the water vapors from the compressed mixture therein, a liquefying and rectification column for separating the compressed mixture in their components, means for delivering the separated components from said rectifying column through said cooling apparatus in heat exchange relationship with the incoming compressed mixture, and pipe connections for delivering the said separated components from said cooling apparatus to said heat exchange unit in countercurrent heat exchange relationship with the compressed mixture flowing therein, and valves in said pipe connections for preventing the expanded mixture from flowing into the cooling apparatus until a predetermined temperature condition has been attained in said unit sufficient to condense substantially all the water vapors from the compressed mixture therein.

7. An apparatus for drying gas mixture preliminary to liquefying and separating one or more components therefrom which includes means for compressing the mixture, a heat exchange unit having an inlet and an outlet for said compressed mixture, an expansion valve at the outlet of said unit, pipe connections between the expansion valve and the pipe for one of the separated components for returning the expanded mixture to said heat exchange unit, means for returning the expanded mixture to said heat exchange unit out of contact with freshly incoming compressed mixture but in heat exchange relationship therewith, a low temperature cooling apparatus, pipe connections for delivering the compressed mixture from said vessel to said cooling apparatus, a low temperature cooling apparatus, pipe connections for delivering the compressed mixture from said heat exchange unit to said cooling apparatus, said connections having valves thereon, whereby said low temperature cooling apparatus may be shut off from receiving compressed mixture from said unit until a predetermined temperature condition has been attained in said unit sufficient to condense substantially all the water vapors from the compressed mixture therein, a liquefying and rectification column for separating the compressed mixture in their components, means for delivering the separated components from said rectifying column through said cooling apparatus in heat exchange relationship with the incoming compressed mixture, and pipe connections for delivering the said separated components from said cooling apparatus to said heat exchange unit in countercurrent heat exchange relationship with the compressed mixture flowing therein, valves in said pipe connections for preventing the expanded mixture from flowing into the cooling apparatus until a predetermined temperature condition has been attained in said unit sufficient to condense substantially all the water vapors from the compressed mixture therein, a pipe connection between the colder part of the cooling apparatus and a heat exchange unit for leading in partly one of the colder components with a lower temperature to said unit, and a valve in said pipe connection for regulating the quantity of said cold component.

8. An apparatus for drying gas mixture preliminary to liquefying and separating one or more components therefrom which includes means for compressing the mixture, a heat exchange unit having an inlet and an outlet for said compressed mixture, an expansion valve at the outlet of said unit, said exchange unit being composed of two interchangeable apparatus, one of these apparatus being in operation while the other one is being defrosted, pipe connections between the expansion valve and the pipe for one of the separated components for returning the expanded mixture to said exchange unit, means for returning the expanded mixture to said heat exchange unit out of contact with freshly incoming compressed mixture but in heat exchange relationship therewith, a low temperature cooling apparatus, pipe connections for delivering the compressed mixture from said vessel to said cooling apparatus, pipe connections for delivering the compressed mixture from said heat exchange unit to said cooling apparatus, said connections having valves thereon, whereby said low temperature cooling apparatus may be shut off from receiving compressed mixture from said unit until a predetermined temperature condition has been attained in said unit sufficient to condense substantially all the water vapors from the compressed mixture therein, a liquefying and rectification column for separating the compressed mixture in their components, means for delivering the separated components from said rectifying column through said cooling apparatus in heat exchange relationship with the incoming compressed mixture and pipe connections for delivering the said separated components from said cooling apparatus to said heat exchange unit in countercurrent heat exchange relationship with the compressed mixture flowing therein, valves in said pipe connections for preventing the expanded mixture from flowing into the cooling apparatus until a predetermined temperature condition has been attained in said unit sufficient to condense substantially all the water vapors from the compressed mixture therein, a pipe connection between the colder part of the cooling apparatus and a heat exchange unit for leading in partly one of the colder components with a lower temperature to said unit, and a valve in said pipe connection for regulating the quantity of said cold component.

ADOLF MESSER.